United States Patent [19]

Komaki

[11] Patent Number: 4,891,013

[45] Date of Patent: Jan. 2, 1990

[54] CONNECTOR FOR A THIN ELECTRONIC APPLIANCE

[75] Inventor: Shigeki Komaki, Nara, Japan

[73] Assignee: Sharp Kabushiki Kaisha, Osaka, Japan

[21] Appl. No.: 319,295

[22] Filed: Mar. 6, 1989

[30] Foreign Application Priority Data

Mar. 7, 1988 [JP] Japan .................................. 63-30057

[51] Int. Cl.$^4$ .......................... H01R 9/09; H01R 4/58; H01R 13/44

[52] U.S. Cl. ........................................ 439/66; 439/74; 439/91; 439/140; 200/512; 200/533

[58] Field of Search ...................................... 439/66–69, 439/74, 91, 136–147, 367, 591, 592, 892, 893; 200/512, 513, 517, 533, 573

[56] References Cited

U.S. PATENT DOCUMENTS

| 4,302,648 | 11/1981 | Sado et al. | 200/512 |
| 4,343,975 | 8/1982 | Sado | 200/517 |
| 4,349,712 | 9/1982 | Michalski | 200/512 |
| 4,515,424 | 5/1985 | Sakurai | 439/142 |
| 4,515,425 | 5/1985 | Nakano | 439/68 |
| 4,650,268 | 3/1987 | Dobson et al. | 439/138 |
| 4,695,925 | 9/1987 | Kodai et al. | 439/141 |
| 4,767,348 | 8/1988 | Murakami | 439/140 |
| 4,780,793 | 10/1988 | Ohtsuki | 439/137 |
| 4,789,347 | 12/1988 | Banjo et al. | 439/140 |
| 4,791,608 | 12/1988 | Fushimoto | 439/137 |

FOREIGN PATENT DOCUMENTS

| 3033134 | 5/1981 | Fed. Rep. of Germany | 200/512 |
| 2062965 | 5/1981 | United Kingdom | 200/513 |

Primary Examiner—P. Austin Bradley
Attorney, Agent, or Firm—Birch, Stewart, Kolasch & Birch

[57] ABSTRACT

A connector for a thin electronic appliance, for example, an IC card reader for electrically connecting the thin electronic appliance with its receiving member, for example, an IC card reader/writer, which comprises a detector switch key body of insulation rubber having a connector base rigidly secured to the receiving member, a plurality of contact electrodes of electrically conductive rubber securely held by the connector base, and a push button portion having a plurality of openings through which the contact electrodes extend. The key body is further provided with a plurality of resilient leg portions extending from the connector base and a key top portion carrying the push button portion and supported by the leg portions. The connector is combined with a detector switch having a plurality of stationary contacts rigidly secured to the receiving member and a movable contact rigidly secured to the lower surface of the key top portion. When the thin electronic appliance is properly set in the receiving member, its connection terminals are electrically connected to the contact electrodes upon depression of the key top portion of the key body and upon deformation of the leg portions. In this event, the detector switch detects that the thin electronic appliance has been properly set in its receiving member. When the thin electronic appliance is not in use, the contact electrodes are hidden inside the openings of the push button portion by virtue of the resiliency of the leg portions.

3 Claims, 2 Drawing Sheets

CONNECTOR FOR A THIN ELECTRONIC APPLIANCE

BACKGROUND OF THE INVENTION

1. Field of the Invention

The present invention relates to a connector for a thin electronic appliance for electrically connecting primarily an IC card with an IC card reader/writer in a separable fashion. The IC card reader/writer reads data from the IC card, writes data therein and executes data processing.

2. Description of the Prior Art

Conventionally, the connector for electrically connecting the IC card with the IC card reader/writer is generally provided with metal electrodes, each of which is comprised of a metal spring. Such a metal spring is not only bent so as to be sufficiently resilient to assuredly maintain contact with an electric terminal of the IC card for a long period of time, but also is required to be superior in durability which disadvantageously results in a complicated construction followed by increased cost. Furthermore, the miniaturization of the connector is limited by the construction of bending the metal spring. This is one of essential factors for preventing the practical use of a pocket type or portable IC card reader/writer which has been in strong demand in recent years. Another essential factor is to provide a separate detector switch, which detects the setting condition of the IC card in its receiving portion, from the connector.

Furthermore, an IC card reader/writer provided with exposed contact electrodes of the connector at the receiving portion of the IC card is somewhat dangerous in that an operator may unconsciously touch the contact electrodes. This is particularly conspicuous in the IC card reader/writer of the kangaroo pocket type, in which a cover is closed after the IC card has been inserted along the cover or of the type in which the cover is closed after the IC card has been inserted into its receiving portion.

SUMMARY OF THE INVENTION

Accordingly, the present invention has been developed with a view to substantially eliminating the above described disadvantage inherent in the prior art connector for a thin electronic appliance, and has for its essential object to provide an improved connector which can be reduced in cost and thickness and is provided with a detector switch for detecting the setting condition of the thin electronic appliance in its receiving portion.

Another important object of the present invention is to provide a connector of the above described type which is superior in safety because contact electrodes thereof are hidden from outside when the thin electronic appliance is not in use.

In accomplishing these and other objects, a connector for a thin electronic appliance according to one preferred embodiment of the present invention comprises a key body of insulation rubber having a connector base rigidly secured to a base of the receiving member, a plurality of resilient leg portions extending from the connector base and a key top portion supported by the leg portions, a plurality of contact electrodes of electrically conductive rubber securely held by the connector base, and a push button portion securely mounted on the key top portion and having a plurality of openings through which the contact electrodes extend.

In such a construction of the connector for the thin electronic appliance, when the thin electronic appliance is properly set in the receiving member, connection terminals thereof are electrically connected to the contact electrodes upon depression of the key top portion of the key body and upon deformation of the leg portions. In contrast, when the thin electronic appliance is not in use, the contact electrodes are hidden inside the openings of the push button portion by virtue of the resiliency of the leg portions.

In another aspect of the present invention, the key body of the connector is of a one-piece construction and the connector is further provided with a detector switch having a plurality of stationary contacts rigidly secured to the base of the receiving member and a movable contact rigidly secured to the lower surface of the key top portion.

When the thin electronic appliance is properly set in its receiving member, the push button portion of the connector is thereby depressed, which pushes the key body of rubber. Accordingly, the movable contact mounted on the lower surface of the key body is brought into contact with the stationary contacts so that the detector switch may be turned on and detect that the thin electronic appliance has been properly set in its receiving member. The displacement of the push button portion exposes the contact electrodes from the openings formed therein. In this event, the contact electrodes are electrically connected to the connection terminals of the thin electronic appliance by virtue of the resiliency of rubber constituting the electrodes.

When the electronic appliance is not set, the contact electrodes are hidden from outside by the push button portion. Accordingly, the danger of accidentially touching the contact electrodes supplied with electricity is avoided. Furthermore, the contact electrodes are made of electrically conductive rubber and thus of the resiliency inherent in the rubber maintains the durability of the connector for a long period of time and also can reduce its thickness. This is primarily due to the fact that the connector of the present invention completely eliminates the necessity of bending metal springs as in the conventional contact electrodes. The detector switch for detecting the setting condition of the thin electronic appliance is provided by making use of the key body of insulation rubber which is depressed by the push button portion when the thin electronic appliance is set and by which the contact electrodes are securely held, thus permitting the connector to be further reduced in thickness.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
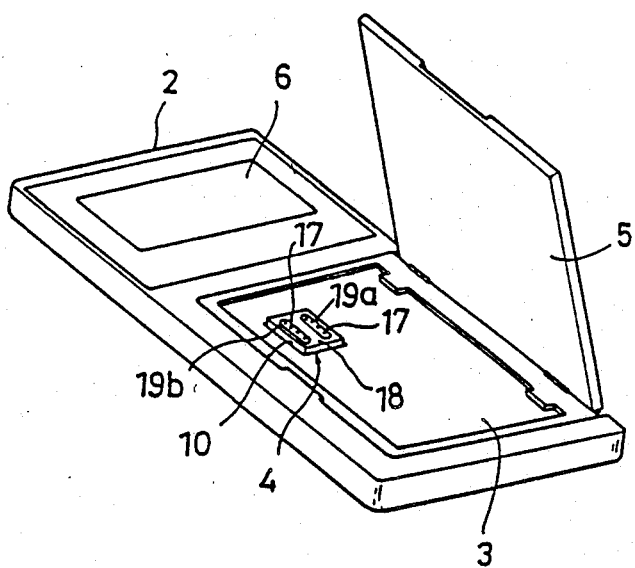
FIG. 1 is a perspective view of an IC card reader/writer provided with a connector for a thin electronic appliance according to the present invention, with its cover being opened.

Referring now to the drawings, there is shown in FIG. 1, an IC card reader/writer 2 which is provided on its upper surface with an IC card receiving portion 3 for receiving therein an IC card, a cover 5 hingedly connected to a casing thereof for opening or closing the IC card receiving portion 3, and a display portion 6. The IC card reader/writer 2 is further provided with a connector 4 according to one preferred embodiment of the present invention at a predetermined location inside the IC card receiving portion 3. When the IC card which is a thin electronic appliance is inserted into the IC card receiving portion 3, it is pressed against the connector 4 by closing the cover 5.

Figure 2:
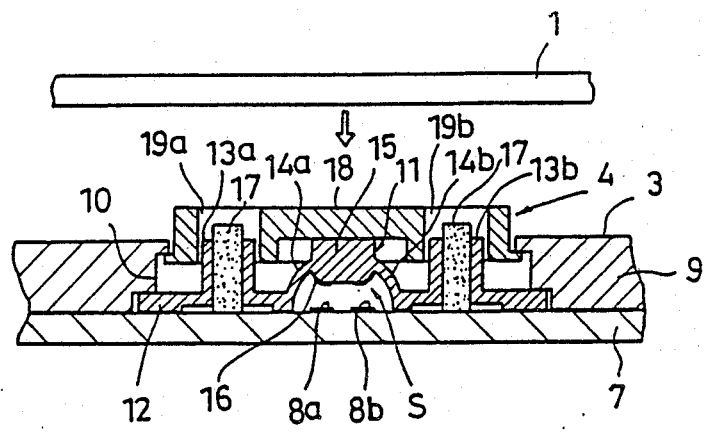
FIG. 2 is a cross-sectional view of the connector before the thin electronic appliance is mounted in the IC card reader/writer.
Figure 3:
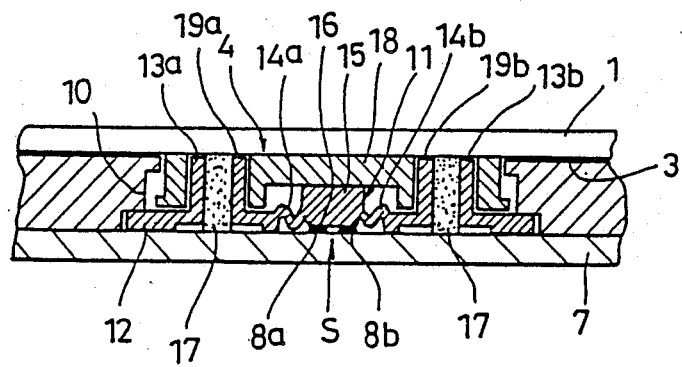
FIG. 3 is a cross-sectional view of the connector after the thin electronic appliance has been mounted in the IC card reader/writer.

FIGS. 2 and 3 depict the connector 4 before the IC card 1 is mounted in the IC card reader/writer 2 and after the former has been mounted in the latter, respectively.

As shown in FIGS. 2 and 3, a pair of stationary contacts 8a and 8b, which constitute a detector switch S for detecting the setting condition of the IC card 1 in the IC card receiving portion 3, are formed on a base plate 7 of the IC card reader/writer 2. A base 9 of the IC card receiving portion 3 is placed on and fixed to the base plate 7 and has an opening 10 formed therein through which the connector 4 is mounted on the base plate 7 and above the stationary contacts 8a and 8b.

The connector 4 is composed of a key body 11 for the detector switch, a plurality of, for example, eight contact electrodes 17 each in the form of a pin and a push button portion 18.

The key body 11 is composed of a connector base 12 placed on and fixed to the base plate 7 inside the opening 10, a pair of bosses 13a and 13b extending upwards from the connector base 12 in parallel with each other, a pair of thin-walled leg portions 14a and 14b and a key top portion 15 supported by the leg portions 14a and 14b. The key top portion 15 is vertically movable by virtue of deformation of the leg portions 14a and 14b. The key body 11 is of a one-piece construction and made of silicone rubber. A movable contact 16 which constitutes the detector switch S with the stationary contacts 8a and 8b is rigidly secured to the lower surface of the key top portion 15.

Each contact electrode 17 is made of electrically conductive rubber in which metallic particles of carbon, nickel, silver, gold or the like are mixed and dispersed in an elastic material cf, for example, silicone rubber. The eight contact electrodes 17 are lined in two rows of four and securely held in the paired bosses 13a and 13b through thermoforming or the like. Each contact electrode 17 is pressed at its lower end against an electrode (not shown) of the base plate 7 so as to be electrically connected therewith and slightly protrudes at its upper end from the corresponding boss 13a or 13b.

The push button portion 18 is made of a synthetic resin, generally in the form of a rectangular plate and is securely crowned on the upper surface of the key top portion 15. This push button portion 18 has two elongated through-openings 19a and 19b through which respective rows of the contact electrodes 17 extend. The contact electrodes 17 are normally hidden in these through-openings 19a and 19b, as shown in FIG. 2.

The connector 4 having the above described construction operates as follows.

As shown in FIGS. 1 and 2, the push button portion 18 normally protrudes upwards from the IC card receiving portion 3 and the contact electrodes 17 are located inside the elongated openings 19a and 19b of the push button portion 18. Accordingly, the accidental touching of any contact electrode 17, supplied with electricity does not occur.

When the IC card 1 is inserted into the receiving portion 3 in the direction as shown by an arrow in FIG. 2 and set therein as shown in FIG. 3 by closing the cover 5, the push button portion 18 is pressed towards the base plate 7 by the IC card 1 and deforms the leg portions 14a and 14b of the key body 11 so that the key top portion 15 of the key body 11 may be depressed together with the push button portion 18. Upon downward movement of the push button portion 18, the contact electrodes 17 appear outside through the elongated openings 19a and 19b and are brought into pressure contact with connection terminals (not shown) of the IC card 1 so that they may be mutually, electrically connected to each other by virtue of the elasticity of the contact electrodes 17, which are made of rubber. In this event, the movable contact 16 bridges both the stationary contacts 8a and 8b and is brought into contact therewith. Accordingly, the detector switch S is turned on and detects that the IC card 1 has been properly set in the IC card receiving portion 3.

From the foregoing, according to the connector 4 of the present invention, the contact electrodes 17 of the electrically conductive rubber are rigidly secured to the detector switch key body 11, made of insulation rubber and are hidden from outside by the detector switch push button portion 18 which is fixedly mounted on the key top portion 15 of the key body 11. When the thin electronic appliance 1 is mounted in its receiving portion 3, the key body 11 is depressed via the push button portion 18 so that the contact electrodes 17 may appear outside from the push button portion 18 to be in pressure contact with the connection terminals of the electronic appliance 1. At the same time, the detector switch S for detecting the setting condition of the electronic appliance 1 is turned on by bringing the movable contact 16 provided on the key body 11 into contact with the stationary contacts 8a and 8b. Accordingly, the contact electrodes 17 are electrically connected to the connection terminals of the electronic appliance 1 by making use of elasticity inherent in the rubber itself. Furthermore, these electrodes 17 are combined with the detector switch S for detecting the setting condition of the thin electronic appliance 1. The connector 4 according to the present invention can, therefore, be remarkably simplified in construction as compared with a conventional connector which produces the elastic force by the resiliency of contact electrodes comprised of metal springs. As a result, the connector 4 of the present invention can be considerably reduced in cost and thickness. Besides, the connector 4 of the present invention is improved in safety and reliability, since the contact electrodes 17 thereof are normally hidden by the push button portion 18.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A connector for a thin electronic appliance for electrically connecting the thin electronic appliance with its receiving member, said connector comprising:
   a key body of insulation rubber having a connector base adapted to be rigidly secured to a base of said receiving member, a plurality of resilient leg portions extending from said connector base and a key top portion supported by said leg portions;
   a plurality of contact electrodes of electrically conductive rubber securely held by said connector base; and
   a push button portion securely mounted on said key top portion and having a plurality of openings through which said contact electrodes extend;

whereby, when said thin electronic appliance is properly set in said receiving member, connection terminals thereof are electrically connected to said contact electrodes upon depression of said key top portion of said key body and upon deformation of said leg portions, and when said thin electronic appliance is not in use, said contact electrodes are hidden inside said openings of said push button portion by virtue of resiliency of said leg portions.

2. The connector according to claim 1, wherein said key body is of one-piece construction.

3. The connector according to claim 2, further comprising a detector switch having a plurality of stationary contacts rigidly secured to said base of said receiving member and a movable contact rigidly secured to said key top portion, wherein said movable contact is brought into contact with said stationary contacts upon depression of said key top portion.

* * * * *